WOVEN CIRCUIT DEVICE

Filed Sept. 6, 1967

INVENTORS
EDGAR A. ROSS
STANLEY RASK
BY
Curtis, Morris & Safford
ATTORNEYS

3,479,565
WOVEN CIRCUIT DEVICE

Edgar A. Ross, Greenville, S.C., and Stanley Rask, New York, N.Y., assignors to Southern Weaving Company, Greenville, S.C.

Filed Sept. 6, 1967, Ser. No. 665,840
Int. Cl. H02b 1/04
U.S. Cl. 317—101 16 Claims

ABSTRACT OF THE DISCLOSURE

The woven circuit device has a central layer of warp wires, two layers of insulating fabric, one on each side of the warp wire layer, and two layers of fill wires, one on each of the outer surfaces of the fabric layers. Selected warp wires are woven through one or both layers of the insulating fabric, over one or more selected fill wires, and back into the central portion of the structure so as to form nodal points in a woven matrix circuit arrangement. The provision of multiple levels of fill wires increases the density of circuit connections available in a given surface area of the device. The whole structure is held together by insulating binder threads which pass through both layers of insulating fabric and around the fill wires and between the warp wires so as to insulate the wires from one another. All of the insulating fabric and wires are woven together in a single continuous weaving process so as to form a tightly bound, integral circuit structure. Electrical circuit components can be mounted on portions of the structure from which the conductors have been removed and can be electrically connected directly to the wires to form a unitary matrix circuit structure with components integrally attached. The device also can be used as a shielded woven cable when no connections are made between the warp wires and the fill wires.

The present invention relates to woven electrical circuit devices such as electrical matrix circuit devices and cable formed by weaving techniques.

A typical prior art woven circuit device consists of interwoven insulating threads and wires with the wires contacting one another at selected points and being insulated from one another at all other points, thus forming a matrix-form electrical circuit. Electrical circuit components such as resistors, transistors and capacitors are connected to the wires in the woven circuit. Such a woven circuit is shown, for example, in our U.S. patent application Ser. No. 532,940, filed Mar. 9, 1966, now U.S. Patent No. 3,371,250, issued Feb. 27, 1968. Although the woven circuit device shown in that patent application is highly satisfactory for many purposes, the present invention provides significant improvements over that device.

One of the major objects of the present invention is to provide an improved woven circuit device in which a relatively large number of electrical circuit connections can be made in a relatively small amount of surface area of the circuit device. Furthermore, it is an object of the present invention to provide such a device whose physical strength is relatively great and in which the nodal connections are reliably secure. Additionally, it is an object of the present invention to provide such a circuit device which is easily fabricated by the use of automated weaving techniques, is of relatively low cost to make, and is compact in size. Further objects and advantages of the present invention will be apparent from or set forth in the following description and drawings in which:

Figure 3:
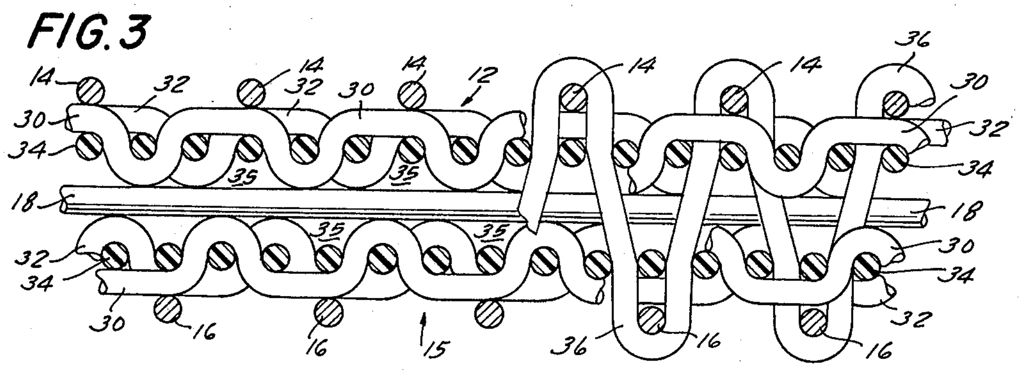
FIGURE 3 is a cross-sectional, partially broken-away and partially schematic view taken along line 3—3 of FIGURE 1.
Figures 1, 2, 4:
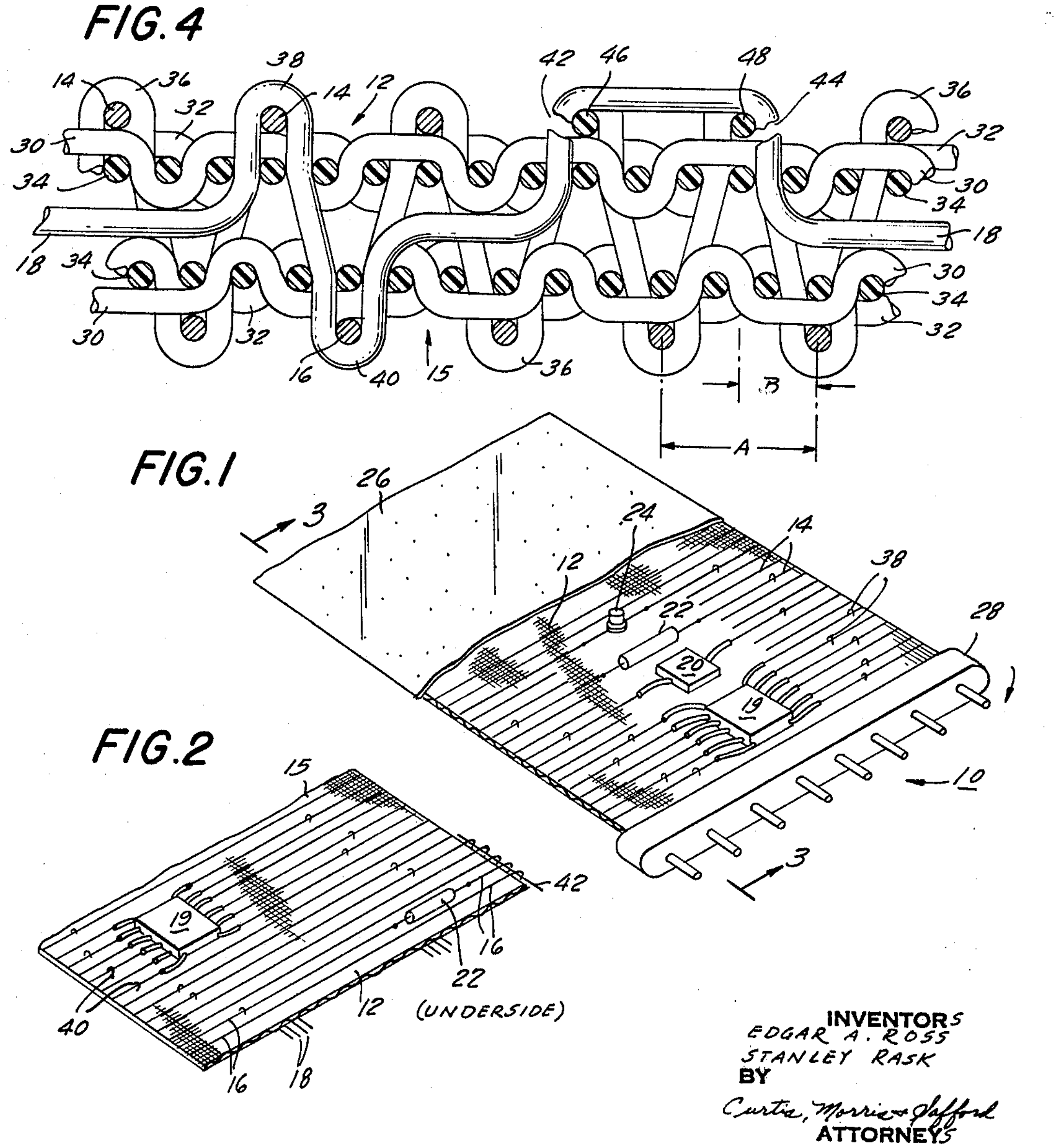
FIGURE 1 is a perspective, partially broken-away view of a woven circuit device constructed in accordance with the present invention.
FIGURE 2 is a perspective view of the underside of a portion of the device shown in FIGURE 1.
FIGURE 4 is a cross-sectional schematic view similar to that of FIGURE 3 illustrating additional features of the structure shown in FIGURE 1.

The matrix-form woven circuit device 10 shown in FIGURE 1 includes an upper layer of woven insulating fabric 12 with "fill" wires 14 secured to the upper surface of the layer 12. Referring to FIGURE 2, which is a view showing the underside of the circuit device 10, the device 10 also has a lower layer 15 of woven insulating material on its underside, with fill wires 16 secured to the surface of layer 15. As also is shown in FIGURE 2, as well as in FIGURES 3 and 4, warp wires 18 are positioned between the layers 12 and 15 of insulating fabric. Electrical circuit components including "flat-pack" integrated circuits 19, capacitors 20, resistors 22, and transistors 24 are mounted on both the upper and lower surfaces of the device 10. The entire assembly is coated with a coating 26 of insulating material, and an electrical terminal connector 28 is provided for connecting the circuit device into associated electrical circuitry.

FIGURES 3 and 4 illustrate the detailed structure of the woven circuit. Each of the woven insulating fabric layers 12 and 15 is formed of warp threads 30 and 32 and fill threads 34 woven together tightly. The insulating threads are made of a material such as fiberglass, nylon, or the like. It is to be noted that each wrap thread 30 or 32 passes first underneath one fill thread 34 and then over two fill threads, under another fill thread, over two, and so forth. The weaving pattern of warp thread 30 is displaced from that of thread 32 by one fill thread. This weaving pattern is desirable in that it facilitates weaving the circuit structure. Furthermore, this pattern leaves no warp thread between the fill thread directly underneath each fill wire 14 and the warp wire 18. Thus, spaces 35 are formed beneath each fill wire 14 so that when the fill wire is pulled tightly into the woven structure, it can sink down into the surface of the fabric 12 and become partially encased by the insulating threads of the fabric 12 or 15.

The fill wires 14 are parallel to and equidistant from one another. Similarly, the fill wires 16 are parallel to and equidistant from one another. Each of the fill wires 16 is located in a vertical plane which is approximately equidistant from vertical planes through each of a pair of adjacent fill wires 14 on the upper surface of the circuit device. A binder thread 36 is woven back and forth through both layers 12 and 15 of insulating fabric and over each of the fill wires 14 and 16 in an alternating manner. The binder warp thread 36 passes between the warp threads 30 and 32. Preferably, one binder warp thread 36 is located between each of the warp wires. This provides lateral separation of the warp wires from one another, and also provides continuous insulation between them. The binder wrap threads 36 bind the entire circuit fabric together into a unitary structure.

As has been noted before, FIGURES 3 and 4 are partially schematic. Thus, for the sake of clarity, the fill wires 14 and 16 are shown positioned on the outer surfaces of the fabrics 12 and 15. However, in actual circuit structures constructed in accordance with the present invention, the fill wires 14 and 16 are embedded somewhat in the surface of the fabrics 12 and 15, and the upper loop portions of the binder pick 36 are flattened somewhat so that the upper end lower surfaces of the fabric are much more nearly smooth than is shown in FIGURES 3 and 4.

FIGURE 4 shows a warp wire 18 different from the the wire 18 shown in FIGURE 3. The warp wire shown in FIGURE 4 has been woven upwardly through the fabric 12, over and around a fill wire 14, downwardly through fabric layer 15, around another fill wire 16 on the undersurface of the circuit structure, and back through layer 15 into the center of the structure. In this manner, nodal points 38 and 40 are formed at which the warp wire is connected to the fill wires in accordance with a desired circuit pattern.

The woven circuit device will have the appearance shown in FIGURES 1 and 2 when completed. As is well known in the art, after weaving, the woven structure can be dip-soldered to solidify the connections at the nodes, or the nodal connections can be welded to obtain the same effect. Of course, the various nodal points 38 and 40 appearing on the upper and lower surfaces of the circuit device will be covered by insulation 26 in the completed device.

As also is well known in the art, it sometimes is desirable to remove certain portions of the warp wires in order to properly form the electrical circuit. In accordance with the present invention, warp wire portions are removed in the manner illustrated in FIGURE 4. The warp wire 18 is woven outwardly through one of the insulating fabric layers 12 or 15, is allowed to pass along the outside surface of the layer, and is woven back into the center of the woven circuit structure, as is illustrated in the right hand portion of FIGURE 4. Then, the warp wire is cut, preferably in two places such as 42 and 44, and the segment of wire which has been cut loose is removed. The fill fibers 46 and 48 over which the warp wire passes at its exit and entrance from the fabric layer can be made of insulating material so as to prevent their inadvertent electrical contact with the severed ends of the warp wire.

The terminal plug 28 may be connected to the ends of the warp wires 18 for coupling the circuit element 10 to associated electrical equipment. However, electrical connections similarly can be made to the fill wires. Thus, the circuit device has versatility in the ways in which it can be used.

In connecting the circuit components 19, 20, 22 and 24 to the element 10, it is preferable to remove portions of the fill wires from surface areas on the woven circuit member, thus leaving fill wire ends abutting areas of insulating cloth which are free of conductors. Then, the circuit elements are placed upon the conductor-free areas and their leads are soldered to the abutting fill wire ends. The fill wires are removed in the selected areas by "floating" them; that is, by failing to bring the binder threads 36 up and over the fill wires in the particular area in which the wires are to be removed. Thus, the wires "float" free of the woven fabric and easily can be cut.

Components can be mounted both on the underside and the upper surface of the circuit device. Furthermore, the components on the underside can be directly underneath, offset from, or arranged in many different ways relative to the components on the upper surface of the device. Therefore, the circuit is very versatile, as well as being physically flexible and compact.

The circuit device 10 can be constructed readily by automated, punch-card-operated looms. The desired wiring pattern merely is programmed into the looms by means such as punched cards. The entire structure can be woven in a single loom operation.

The density of electrical connections which can be made in a given surface area of the device of the present invention is twice that of prior woven circuits, but the amount of wire used in the device is not twice as much. Only one extra layer of fill wires is required in the devices of the present invention. Furthermore, the effective spacing of the wires from one another can be made twice as close as in prior woven circuits without at all increasing the danger of short-circuiting the wires together. For example, referring to FIGURE 4, the actual spacing A between adjacent fill wires 16 on the undersurface of the circuit device can, for example be 50 mils (thousandths of an inch), with the fill wires 14 on the upper surface of the device having the same spacing. However, the effective spacing between fill wires will be the distance B; that is, the distance between the centerline of a fill wire 14 and the center line of the nearest fill wire 15. This distance B is one half of A; that is, 25 mils in the specific example. The effective spacing thus is half of the actual fill wire spacing. Therefore, the connection density has been doubled without in the least reducing the safety factor against short-circuiting.

Not only is the circuit connection density greater in the woven circuit of the present invention, but the connections between the warp and fill wires are much more secure. Thus, the device is more reliable than prior art devices.

The circuit device 10 also is dimensionally much more stable than prior woven circuits because the binder warp threads 36 pull the fill wires together from both sides of the circuit structure. Thus, the binding pressure from the binder warp threads 36 is applied symmetrically to the woven circuit structure with the result that the structure will be tighter and will not allow the wires to shift or slide easily with respect to one another.

The structure shown in FIGURE 3 can be used as shielded cable. Preferably, the warp wires do not contact the fill wires, and the fill wires are used as shields while alternate or other selected ones of the warp wires are the signal conductors. The ends of the fill wires and the nonselected warp wires can be connected together by appropriate means such as a bus-bar 42 (see FIGURE 2) which can be connected to the ends of the wires which extend beyond the edges of the fabric. The bus-bar 42 can be a length of relatively large diameter stranded wire, for example.

The above description of the invention is intended to be illustrative and not limiting. Various changes or modifications in the embodiments described may occur to those skilled in the art and these can be made without departing from the spirit or scope of the invention as set forth in the claims.

We claim:

1. A woven circuit device comprising, in combination, first, second and third groups of conductors, the conductors of each group extending in side-by-side, spaced-apart relationship to one another, each group being located in a separate one of three superimposed planes, woven insulating fabric separating said groups from one another, strands of said fabric binding said wire groups and fabric together into a unitary structure, selected ones of the conductors in one of said groups being woven so as to pass through the fabric and make contact with selected ones of the conductors in another of the groups of conductors.

2. Apparatus as in claim 1 in which the direction in which the conductors of one of said groups extend is transverse to the directions in which the conductors of the other groups extend.

3. Apparatus as in claim 1 in which said conductors of said one group are woven through said fabric into contact with conductors of both of said other groups.

4. A woven circuit device comprising an integrally woven sandwich structure having a central layer of wires, first and second layers of woven insulating fabric, one positioned on said one side and the other on the other side of said central layer of wires, first and second groups of wires, each group being positioned on the outside of a different one of said fabric layers with the wires therein extending transversely to the wires in said central layer, and insulating binder threads woven back and forth through said sandwich structure and around selected ones of the fill wires in said first and second groups so as to bind together the components of said sandwich structure.

5. Apparatus as in claim 4 in which the wires in each of said first and second groups are substantially parallel and spaced evenly with respect to one another, each wire of one of said groups being located in a plane approximately equidistant from parallel planes containing adjacent wires of the opposite group.

6. Apparatus as in claim 5 in which each of said binder threads is woven around each of the wires in each of said groups in an alternating pattern.

7. Apparatus as in claim 4 in which one of said binder threads passes back and forth through said sandwich structure between each pair of adjacent ones of said wires in said central layer.

8. A woven circuit device comprising an integrally woven sandwich structure having a central layer of wires, first and second layers of woven insulating fabric, one positioned on one side and the other on the other side of said central layer of wires, first and second groups of wires, each group being positioned on the outside of a different one of said fabric layers with the wires therein extending transversely to the wires in said central layer, and insulating binder threads woven back and forth through said sandwich structure and around selected ones of the fill wires in said first and second groups so as to bind together the components of said sandwich structure, selected ones of the wires in said central layer being woven to pass through said fabric and make contact with selected ones of the wires in said groups.

9. Apparatus as in claim 8 in which the wires in each of said first and second groups are substantially parallel and spaced evenly with respect to one another, each wire of one of said groups being located in a plane approximately equidistant from parallel planes containing adjacent wires of the opposite group.

10. Apparatus as in claim 9 in which each of said binder threads is woven around each of the wires in each of said groups in an alternating pattern.

11. Apparatus as in claim 8 in which one of said binder threads passes back and forth through said sandwich structure between each pair of adjacent ones of said wires in said central layer.

12. A matrix-form woven circuit device comprising a plurality of spaced-apart warp wires, two sets of spaced-apart fill wires, woven insulating sheets, said sheets and wires being secured together to form a unitary structure with the warp wires forming a central layer, the insulating sheets being located on opposite sides of said warp wires, and said fill wires being located on opposite sides of said sheets, binder threads woven back and forth through said structure and around said fill wires in an alternating pattern, one binder thread being located between each pair of adjacent warp wires, selected ones of said warp wires being woven to pass through said sheets to wrap around and make contact with selected fill wires to form an electrical circuit.

13. Apparatus as in claim 12 in which said fill wires are terminated at selected areas on the outer surfaces of said structure with their end abutting said areas, said areas thus being free of wires, and electrical circuit components mounted on said areas and electrically connected to said fill wires.

14. Apparatus as in claim 12 in which each of said woven sheets is composed of insulating warp and fill threads with the warp threads each being woven first under one fill thread and then over two fill threads in a repetitive pattern, the patterns of adjacent warp threads being offset from one another by the space of one fill thread, the fill and warp threads forming spaces between the fill threads and the central layer of warp wires.

15. Apparatus as in claim 13 in which said components are mounted on both sides of said structure.

16. Apparatus as in claim 13 including an insulating coating over said circuit structure, and terminal connector means connected to said warp wires.

References Cited

UNITED STATES PATENTS

| | | |
|---|---|---|
| 3,255,047 | 6/1966 | Escoffery. |
| 3,371,250 | 2/1968 | Ross et al. |

FOREIGN PATENTS

| | | |
|---|---|---|
| 1,175,761 | 8/1964 | Germany. |

ROBERT K. SCHAEFER, Primary Examiner

J. R. SCOTT, Assistant Examiner

U.S. Cl. X.R.

139—425; 174—68.5